(12) United States Patent
Kurashima et al.

(10) Patent No.: US 9,459,720 B2
(45) Date of Patent: Oct. 4, 2016

(54) TOUCH PANEL

(71) Applicant: FUJITSU COMPONENT LIMITED, Tokyo (JP)

(72) Inventors: Shigemi Kurashima, Tokyo (JP); Mitsuhiro Sekizawa, Tokyo (JP); Satoshi Sakurai, Tokyo (JP); Nobuyoshi Shimizu, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 258 days.

(21) Appl. No.: 13/923,469

(22) Filed: Jun. 21, 2013

(65) Prior Publication Data
US 2014/0028586 A1 Jan. 30, 2014

(30) Foreign Application Priority Data

Jul. 24, 2012 (JP) .................... 2012-164040

(51) Int. Cl.
*G06F 3/045* (2006.01)
*G06F 3/041* (2006.01)
*G06F 3/044* (2006.01)

(52) U.S. Cl.
CPC .......... *G06F 3/0412* (2013.01); *G06F 3/044* (2013.01); *G06F 3/0416* (2013.01)

(58) Field of Classification Search
CPC ..................................... G06F 3/044
See application file for complete search history.

(56) References Cited

U.S. PATENT DOCUMENTS

| | | | | |
|---|---|---|---|---|
| 4,567,470 A | * | 1/1986 | Yoshikawa et al. | 341/33 |
| 2001/0024194 A1 | | 9/2001 | Shigetaka et al. | |
| 2010/0033437 A1 | * | 2/2010 | Matsubara | 345/173 |
| 2011/0080370 A1 | * | 4/2011 | Wu | 345/174 |
| 2013/0002607 A1 | | 1/2013 | Bayramoglu | |
| 2013/0257754 A1 | * | 10/2013 | Liu et al. | 345/173 |
| 2014/0092056 A1 | * | 4/2014 | Jhou et al. | 345/174 |
| 2014/0152621 A1 | | 6/2014 | Okayama et al. | |

FOREIGN PATENT DOCUMENTS

| | | |
|---|---|---|
| CN | 101261552 | 9/2008 |
| JP | 2001-243010 | 9/2001 |
| JP | 2011-215675 | 10/2011 |
| TW | 201211865 | 3/2012 |
| TW | 201220165 | 5/2012 |
| WO | 2013/069289 | 5/2013 |

* cited by examiner

*Primary Examiner* — Nicholas Lee
(74) *Attorney, Agent, or Firm* — IPUSA, PLLC

(57) ABSTRACT

A disclosed touch panel includes a panel including a plurality of first conductive films arranged in a first direction, and a plurality of second conductive films arranged in a second direction different from the first direction; a first selecting unit connected to the first conductive films to select one first conductive film or more from the first conductive films; a second selecting unit connected to the second conductive films to select one second conductive film or more from the second conductive films; and an inductor connecting the first selecting unit with a power source, which applies a voltage to the first conductive films.

13 Claims, 18 Drawing Sheets

TOUCH PANEL

CROSS-REFERENCE TO RELATED APPLICATIONS

This patent application is based upon and claims the benefit of priority of Japanese Patent Application No. 2012-164040 filed on Jul. 24, 2012, the entire contents of which are incorporated herein by reference.

BACKGROUND OF THE INVENTION

1. Field of the Invention

The present invention relates to a touch panel.

2. Description of the Related Art

An example of a capacitance type touch panel changes an electric potential of a detection electrode pattern, which is arranged on an input plane, using an alternating detection signal having a fixed frequency, and causes a common-mode signal to be generated in an input operating object having a fixed electric potential relative to the detection electrode pattern.

The common mode signal of the fixed frequency f is detected from a part of the detection electrode pattern, whose floating capacitance between the input operating object increases, and the input position with the input operating object is detected from the part on the detection electrode pattern, as disclosed in Japanese Laid-open Patent Publication No. 2011-215675.

SUMMARY OF THE INVENTION

According to an aspect of the present invention, there is provided a touch panel including a panel including a plurality of first conductive films arranged in a first direction, and a plurality of second conductive films arranged in a second direction different from the first direction; a first selecting unit connected to the first conductive films to select one first conductive film or more from the first conductive films; a second selecting unit connected to the second conductive films to select one second conductive film or more from the second conductive films; and an inductor connecting the first selecting unit with a power source, which applies a voltage to the first conductive films.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF EMBODIMENTS

A description of embodiments of the present invention is given below, with reference to FIG. 1 through FIG. 20. Where the same reference symbols are attached to the same parts, repeated description of the parts is omitted.

[a] First Embodiment

Figure 1:
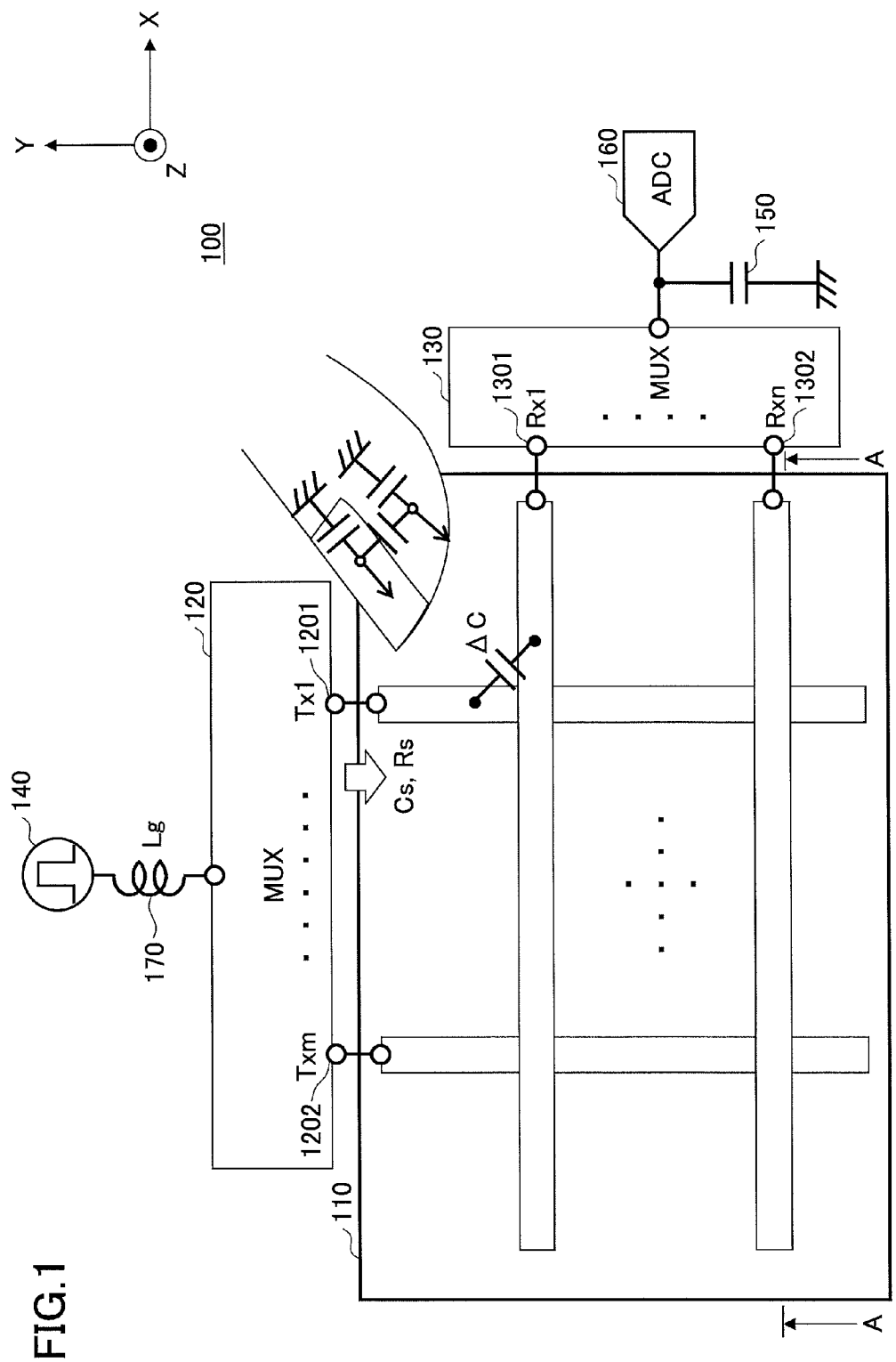
FIG. 1 is a plan view of a touch panel of a first embodiment.
Figure 2:
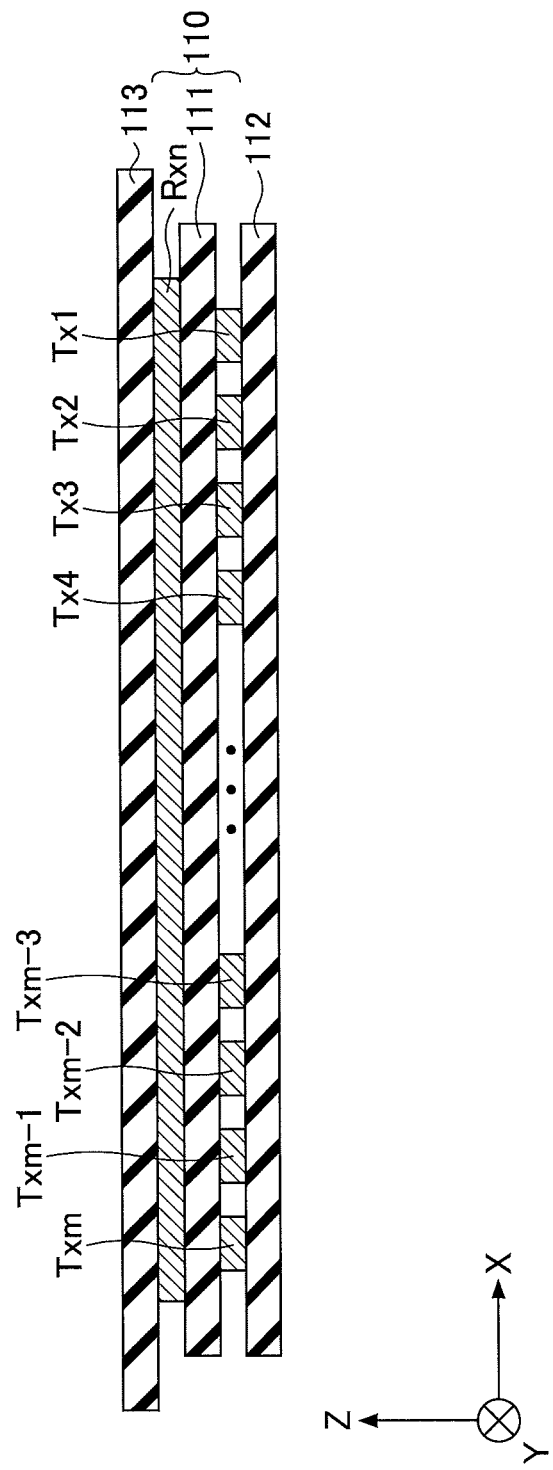
FIG. 2 illustrates a cross-sectional view taken along a line A-A of FIG. 1.

FIG. 1 is a plan view of a touch panel 100 of a first embodiment. FIG. 2 illustrates a cross-sectional view of the touch panel 100 taken along a line A-A of FIG. 1. In FIGS. 1 and 2, elements of the touch panel 100 are partly illustrated for easiness of understanding. For convenience of the explanation, axes X, Y, and Z are defined in FIGS. 1 and 2.

Referring to FIG. 1, the touch panel 100 includes an electrostatic panel 110, a multiplexer (MUX) 120, a multiplexer (MUX) 130, a driving source 140, a capacitor 150, an Analog to Digital Converter (ADC) 160, and an inductor 170.

The electrostatic panel 110 is an input portion of the touch panel 100. When the user touches the touch panel with a finger or the like, an operation input can be carried out. The electrostatic panel 110 is an example of a panel. The electrostatic panel 110 includes a transparent film 111, a plurality of electrodes Tx1 1201 to Txm 1202 (m is an arbitrary integer) arranged in the X-axis direction, and a plurality of electrodes Rx1 1301 to Rxm 1302 (n is an arbitrary integer) arranged in the Y-axis direction. Here, the number m of the electrodes Tx1 1201 to Txm 1202 may be the same as or different from the number n of the electrodes Rx1 1301 to Rxn 1302.

Referring to FIG. 2, the electrode Rxn is formed on a first surface of a transparent film 111. Referring to FIG. 2, the electrodes Rx1 to Rxn−1 are formed on the first surface of the film 111 in a manner similar to the electrode Rxn. Referring to FIG. 1, the electrodes Rx1 to Rxn are connected to the multiplexer 130.

Further, referring to FIG. 2, the electrodes Tx1 to Txm are formed in the second surface of the film 111 opposite to the first surface. Referring to FIG. 1, the electrodes Tx1 to Txm are connected to the multiplexer 120.

The film 111 is a transparent film made of, for example, polycarbonate or polyethylene terephthalate (PET). The electrodes Tx1 to Txm and the electrodes Rx1 to Rxn are indium tin oxide (ITO) formed on surfaces of the film 111, respectively.

Referring to FIG. 2, a transparent film 112 is provided on the back surface side of the electrostatic panel 110. Further, a decoration sheet 113 is provided on a front surface of the electrostatic panel 110. The transparent film 112 and the decoration film 113 are made of, for example, polycarbonate or polyethylene terephthalate (PET).

The multiplexer 120 is connected to the electrodes Tx1 to Txm. The driving source 140 is connected to the multiplexer through the inductor 170. The multiplexer 120 is an example of a first selecting unit. The multiplexer 120 selectively outputs a rectangular wave voltage input from the driving source 140 through the inductor 170 to the electrodes Tx1 to Txm. The multiplexer 120 selects the electrodes Tx1 to Txm one by one in this order, and applies the rectangular wave voltage to the selected electrodes Tx1 to Txm.

The multiplexer 130 is connected to the electrodes Rx to Rxn. The capacitor 150 and the ADC 160 are connected to the multiplexer 130. The multiplexer 130 is an example of a second selecting unit. The multiplexer 130 selects the electrodes Rx1 to Rxn one by one in this order, and applies the voltages of the selected electrodes Rx1 to Rxn to the capacitor 150 and the ADC 160.

The driving source 140 is a source of voltage for outputting a rectangular ware voltage. The rectangular wave voltage is shaped like a clock and has a predetermined frequency.

One end of the capacitor 150 is connected between a terminal of the multiplexer 130 and the input terminal of the ADC 160, and the other end of the capacitor 150 is grounded.

The ADC 160 detects the voltage input from the multiplexer 130, converts the detected voltage to a digital signal, and outputs the converted digital signal.

The inductor 170 is connected between the driving source 140 and the multiplexer 120.

In the above mentioned touch panel 100, while the multiplexer 130 selects one of the electrodes Rx1 to Rxn, the multiplexer 120 selects the electrodes Tx1 to Txm and applies the rectangular wave voltage to the selected electrode. This process is repeated for each of the selected electrodes Rx1 to Rxn.

In this case, electrostatic capacitances between the electrodes Tx1 to Txm and the electrodes Rx1 to Rxn are constant as default values in a case where the user does not touch the electrostatic panel 110. Therefore, the value of the digital signal output from the ADC 160 is constant. Said differently, while a finger of the user does not touch the electrostatic panel 110, the value of the electrostatic capacitance detected by the electrodes Tx1 to Txm and the electrodes Rx1 to Rxn is constant.

Referring to FIG. 1, when the finger of the user touches the electrostatic panel 110 through the decoration film 113, the electrostatic capacitance at the portion of the electrostatic panel 110 where the finger touches changes. Referring to FIG. 1, an example that the electrostatic capacitance changes by ΔC with a touch of the user's finger is schematically illustrated.

While selecting the electrodes Tx1 to Txm in order for each of the electrodes Rx1 to Rxn and repeatedly detecting the electrostatic capacitances, if a change of the electrostatic capacitances occurs by a touch of a user's finger, it is possible to determine a position of the electrostatic panel 110 where the electrostatic capacitance changes using combinations of the electrodes Tx1 to Txm and the electrodes Rx1 to Rxn. As a result, it is possible to determine the position where the operation input is done. With this, the coordinate where the operation input is done can be detected by the touch panel 100.

Meanwhile, the electrostatic capacitances of the electrostatic panel 110 are not ignorable. Therefore, when the rectangular wave voltages are input to the electrodes Tx1 to Txm from the multiplexer 120, rise and decay of the voltage detected by the multiplexer 130 through the electrodes Rx1 to Rxn may become gentle.

Figure 3:
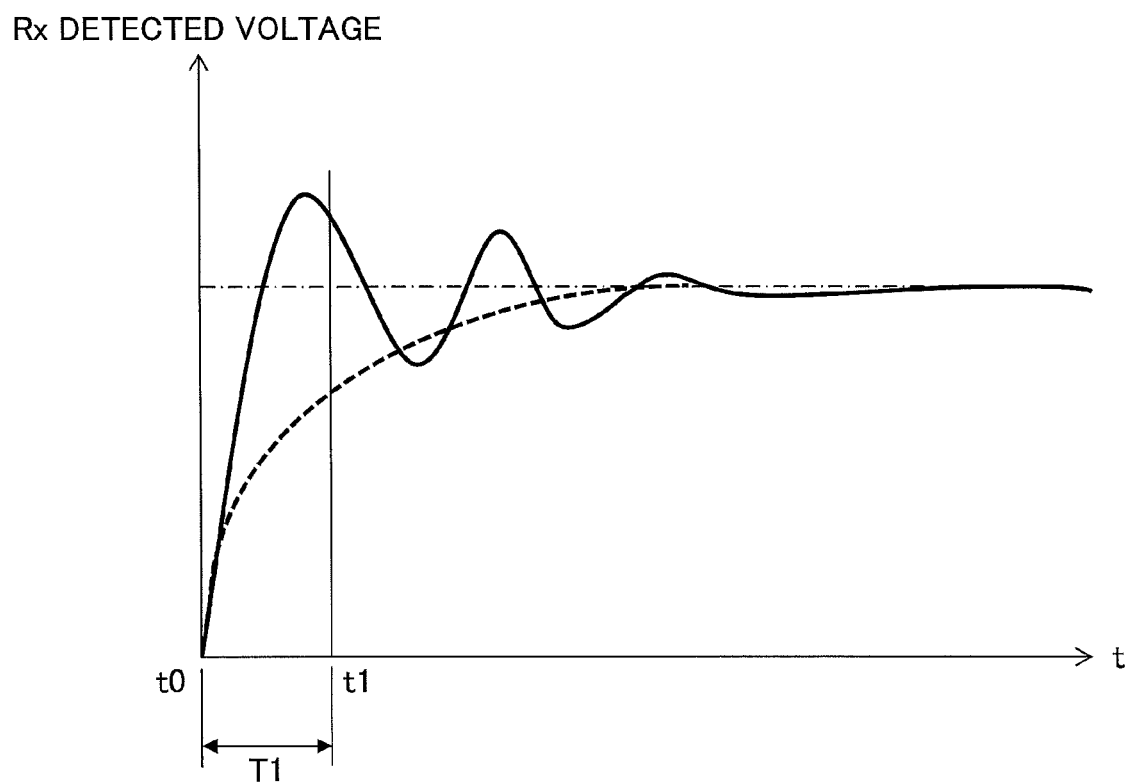
FIG. 3 illustrates an example of a waveform during rise detected by a multiplexer.

Referring to FIG. 3, an exemplary waveform during rise of the voltages detected by the multiplexer 130 is illustrated. The solid line indicates a waveform during rise of the voltage in the touch panel 100 of the first embodiment with the inductance 170, and the broken line indicates a comparative waveform during rise of the voltage in a touch panel that does not include the inductor for comparison. Referring to FIG. 3, the ordinate axis represents the voltage output from the electrodes Rx1 to Rxn, and the abscissa axis represents a time.

Referring to FIG. 3, the change in waveform during rise indicated by the broken line is gentle. However, the waveform indicated by the solid line sharply rises in comparison with the gentle waveform in the broken line.

In the first embodiment, the inductance L1 of the inductor 170 is set so as to satisfy Formula 1, denote that the electrostatic capacitance of the electrostatic panel 110 is C1 and the resister value of the electrostatic panel 110 is R1.

$$L1 \geq C1 \times (R1/2)^2 \qquad \text{Formula 1}$$

When the left side of Formula 1 equals to the right side of the Formula 1, the voltage applied between the electrodes Tx1 to Txm and the electrodes Rx1 to Rxn show a simple harmonic oscillation, and an oscillatory solution is obtained based on Formula 1. By setting the inductance L1 of the inductor 170 to have the value same to or greater than the inductance giving the oscillatory solution as in Formula 1, it is possible to substantialize the precipitous rise as in the solid line in FIG. 3.

By setting the inductance L1 of the inductor 170 to have a value satisfying Formula 1, the oscillation of the voltage may occur as shown in the solid line in FIG. 3. However, by limiting the time period for detecting the voltage with the ADC 160 to a time period T1 between a time t0 and a time t1, the oscillation occurs after the time t1 does not relate to the detection. Therefore, even if oscillation of the voltage occurs, it would cause no specific problem in detecting the voltages.

For example, when the electrostatic panel 110 is 7 inches, and if the electrostatic capacitance of the electrostatic panel 110 is 50 pF and the resistor value is 15 kΩ, the inductance L1 of the inductor 170 shall be L1≥2.8 mH.

In the first embodiment, by inserting the inductor 170 between the driving source 140 and the multiplexer 120, it is possible to sharpen the rise of the voltage to be detected by the ADC 160. Therefore, the touch panel 100 having a good response in detecting the operation input by the user is obtainable. Said differently, the touch panel 100 having good detection sensitivity for an operation input can be provided.

[b] Second Embodiment

Figure 4:
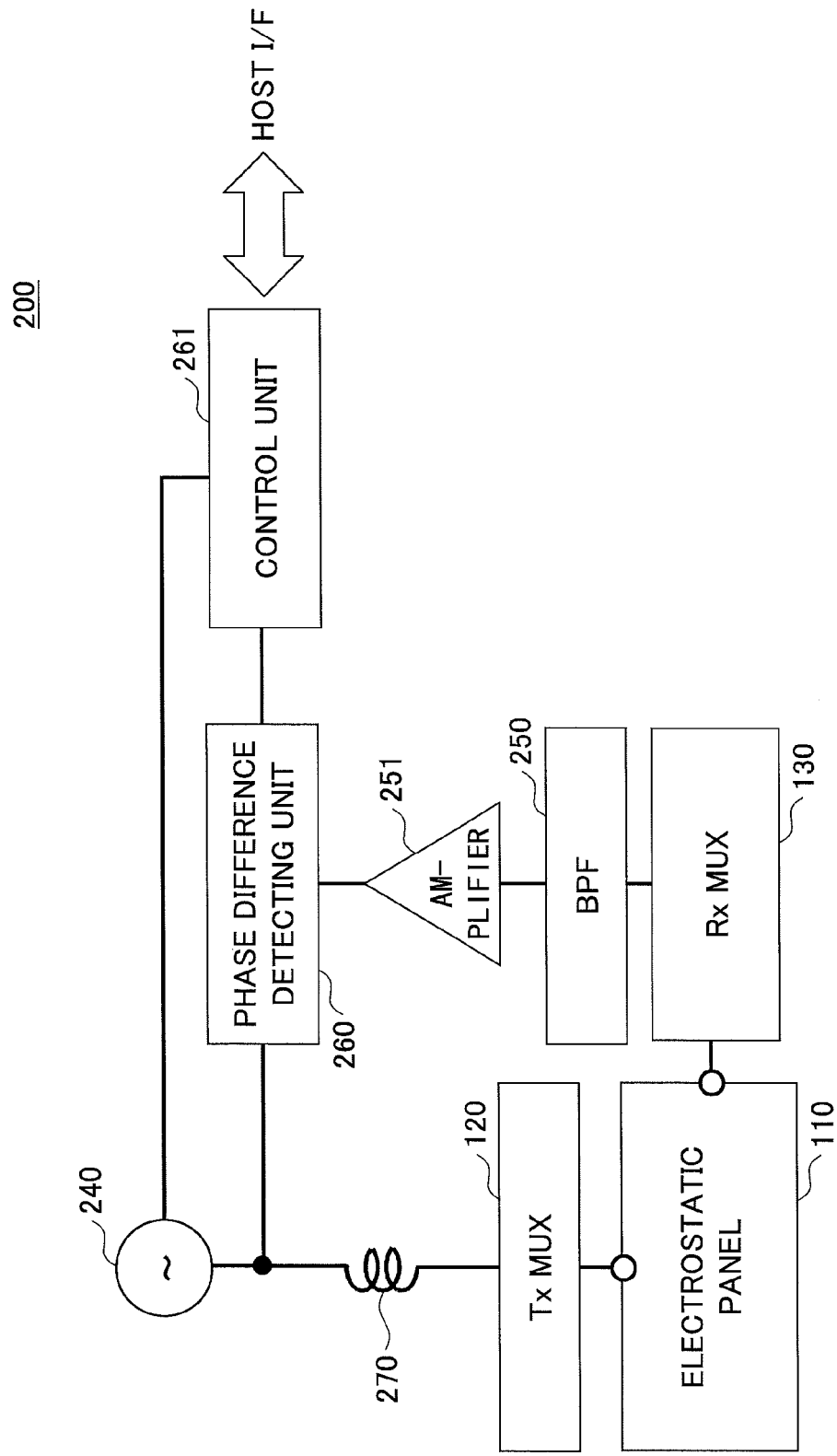
FIG. 4 illustrates a touch panel of a second embodiment.

FIG. 4 illustrates a touch panel 200 of a second embodiment. In order to facilitate understanding of the touch panel 200, only several elements of the touch panel 200 are schematically illustrated. The same reference symbols are attached to the elements similar to the touch panel 100 of the first embodiment, and description of the similar elements is omitted The touch panel 200 includes an electrostatic panel 110, a multiplexer 120, a multiplexer 130, a driving source 240, a band-pass filter 250, an amplifier 251, a phase difference detecting unit 260, a control unit 261, and an inductor 270.

The driving source 240 is a source of voltage for outputting a sine wave voltage. The driving source 240 is controlled by the control unit 261 and outputs a voltage to the multiplexer 120 through the inductor 270.

The band-pass filter 250 outputs a predetermined band of the voltage output from the multiplexer 130. By using the band-pass filter 250, for example, noise or the like from a liquid crystal display provided on the back surface of the touch panel 200 can be removed.

The amplifier 251 amplifies the voltage output from the band-pass filter 250 and outputs the amplified voltage to the phase difference detecting unit 260.

The phase difference detecting unit 260 detects a phase difference between the sine wave voltage input from the driving source 240 and the sine wave voltage input from the amplifier 251.

The control unit 261 provides a signal indicative of the phase difference detected by the phase difference detecting unit 260 with waveform shaping or the like, and outputs the signal to a host interface (I/F) together with data indicative of the coordinate where the operation input is detected on the electrostatic panel 110. A control unit of a terminal, which includes the touch panel 200, is connected to the host interface.

The inductor 270 is connected between the driving source 240 and the multiplexer 120.

In the touch panel 200, when the sine wave voltage output from the driving source 240 is input into the phase difference detecting unit 260 through the inductor 270, the multiplexer 120, the electrostatic panel 110, the multiplexer 130, the band-pass filter 250, and the amplifier 251, the phase of the voltage is delayed mainly by the electrostatic capacitance of the electrostatic panel 110. The phase difference detecting unit 260 detects a phase difference between the sine wave voltage input from the driving source 240 and the sine wave voltage input from the amplifier 251.

In a case where there is not operation input by the user, the phase difference detected by the phase difference detecting unit 260 has a predetermined value.

Meanwhile, if there is an operation input by the user, the electrostatic capacitance changes at a position where the finger of the user touches the electrostatic panel 110. This change is similar to the case in the first embodiment illustrated in FIG. 1.

As such, if the electrostatic capacitance changes, the phase of the sine wave voltage changes. Therefore, by detecting the change of the phase difference, it is possible to determine the position where the operation input is done. With this, the touch panel 200 can detect the coordinate where the operation input is done.

When a phase difference between two different sine wave voltages is detected, it is most efficient to detect at a time when one of the phases of the two sine wave voltages is 0 degrees or 180 degrees. This is because the rate of change of the waveform is greatest at the phases of 0 degrees and 180 degrees.

Figure 5:
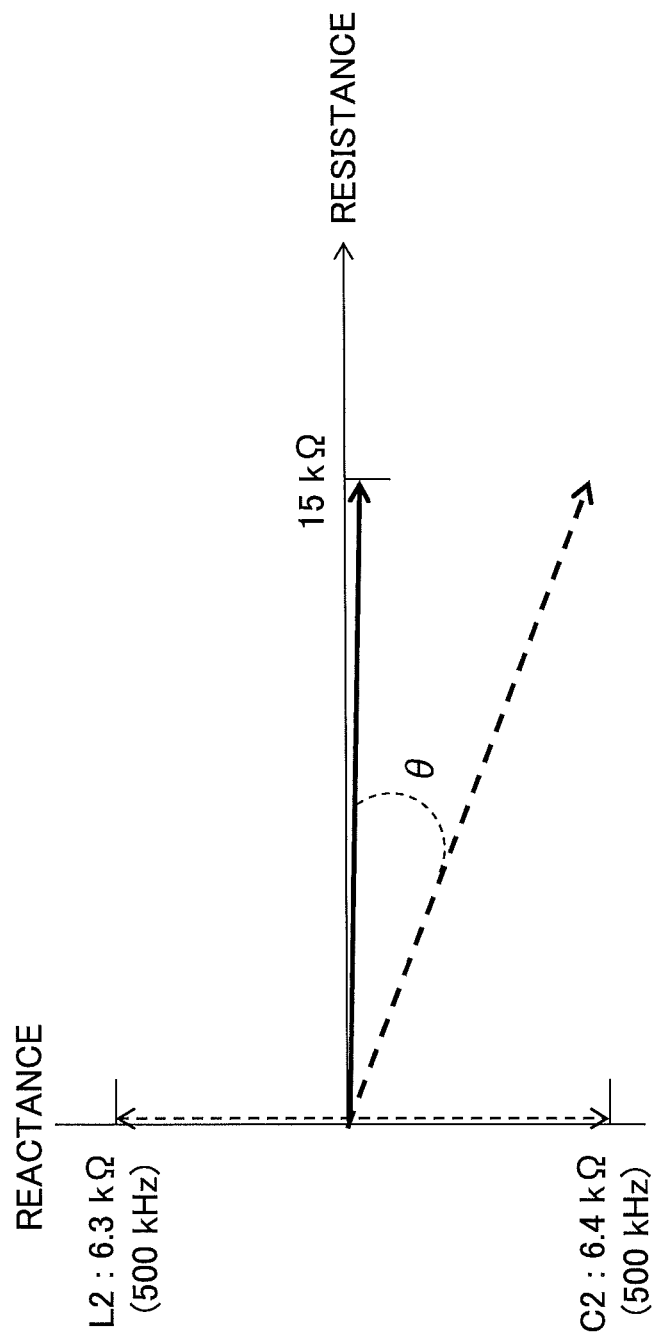
FIG. 5 illustrates the impedance of the touch panel of the second embodiment in an orthogonal coordinate system.

FIG. 5 illustrates the impedance of the touch panel 200 of the second embodiment in an orthogonal coordinate system. The impedance illustrated in FIG. 5 appears in the driving source 240, the inductor 270, the multiplexer 120, the electrostatic panel 110, the multiplexer 130, the band-pass filter 250, the amplifier 251, and the phase difference detecting unit 260. Referring to FIG. 5, the abscissa axis represents a real component, and the ordinate axis represents an imaginary component.

However, the impedance of the electrostatic panel 110 is dominating. Therefore, a synthetic impedance of the inductor 270 and the electrostatic panel 110 is compared with an impedance of only the electrostatic panel 110 without the inductor 270.

Referring to FIG. 5, on the positive side of the abscissa axis (the right side on FIG. 5), the phase of the sine wave voltage output from the driving source 240 is 0 degrees.

Although the electrostatic panel 110 has a relatively great electrostatic capacitance, the inductance is relatively small. Therefore, the phase of the sine wave voltage (shown in dotted line) output from the multiplexer 130 of the touch panel 270 without the inductor 270 changes by θ in comparison with the phase (0 degrees) of the sine wave voltage output from the driving source 240.

This is because the absolute value of the negative imaginary component (the capacitance) becomes relatively great since the inductance of the electrostatic panel 110 is relatively small in comparison with the electrostatic capacitance of the electrostatic panel 110.

On the other hand, in the first embodiment where the inductor 270 is inserted between the driving source 240 and the multiplexer 120, the phase change of the sine wave voltage output from the multiplexer 130 is small as indicated by the solid line, and the phase of the sine wave output from the multiplexer 130 becomes very close to the phase of the sine wave voltage output from the driving source 240.

In a case where the size of the electrostatic panel 110 is 7 inches, and the capacitance C2 is 50 pF, the resistance value R2 is 15 kΩ, and the frequency of the sine wave voltage output from the driving source 240 is 500 kHz, the impedance of the electrostatic panel 110 contains a negative imaginary component of about 6.4 kΩ.

Therefore, in the case where the inductor 270 is not included in the touch panel, θ becomes −22.99° as illustrated in the broken line in FIG. 5.

If it is assumed that a touch of a human finger causes a change of the electrostatic capacitance as much as 5 pF, the phase θ of the sine wave voltage is −21.10° while the human finger touches the electrostatic panel 11. Therefore, the phase difference is 1.89°.

Meanwhile, in the touch panel 200 of the second embodiment, the inductance of the inductor 270 is set to have a positive imaginary component of about 6.3 kΩ. Specifically, the inductance L2 of the inductor 270 is set to 2.0 mH.

The inductance L2 of the inductor 270 is set based on Formula 2.

$$L2=1/(C2\times(2\pi f)^2)  \quad \text{Formula 2}$$

If it is assumed that the capacitance C2 is 50 pF, the resistance value R2 is 15 kΩ, and the frequency of the sine wave voltage output from the driving source 240 is 500 kHz in a case where the size of the electrostatic panel 110 is 7 inches, L2 shall be L2=2.0 mH.

While the human finger does not touch the electrostatic panel 110, the phase of the voltage output from the multiplexer 130 is −0.317°. If there is a change in the electrostatic capacitance of 5 pF after the human finger touches the electrostatic panel 110, the phase θ of the voltage output from the multiplexer 130 while the human finger touches the electrostatic panel 110 becomes +1.893°. Therefore, the phase difference is 2.21°.

As described, in the touch panel 200 of the second embodiment, the phase difference (before and after operation input) can be improved from 1.89° from the phase difference of 2.21° in the case where the inductor 270 is not included, by about 17%.

Further, in the touch panel 200 of the second embodiment, the phase difference detecting unit 260 can detect the phase difference between the sine wave voltage directly input from the driving source 240 and the sine wave voltage input from the amplifier 251 through the inductor 270 and the electrostatic panel 110 at a condition where the phase of the sine wave voltage directly input from the driving source 240 is around 0°. Therefore, the phase difference can be securely detected.

Therefore, within the second embodiment; the touch panel 200 having a good response in detecting the operation input by the user can be provided. Thus, the touch panel 200 having good detection sensitivity for an operation input can be provided.

The mode of obtaining the inductance L2 satisfying the condition where the left side of Formula 2 equals to the right side of Formula 2 is described above. In a case where it is difficult to determine the value of the inductance L2 satisfying the condition where the left side of Formula 2 exactly equals to the right side of Formula 2, Formula 2 may be modified to Formula 2A.

$$L2\cong 1/(C2\times(2\pi f)^2) \quad \text{Formula 2A}$$

Said differently, the value of the inductance L2 of the inductor 270 can be finely adjusted so that Formula 2A can be established. In this case, a tolerable range of the value obtained from Formula 2 may be set so as to be within, for example, ±5%.

Instead of using the sine wave voltage, a rectangular wave as in the first embodiment may be used.

[c] Third Embodiment

Figure 6:
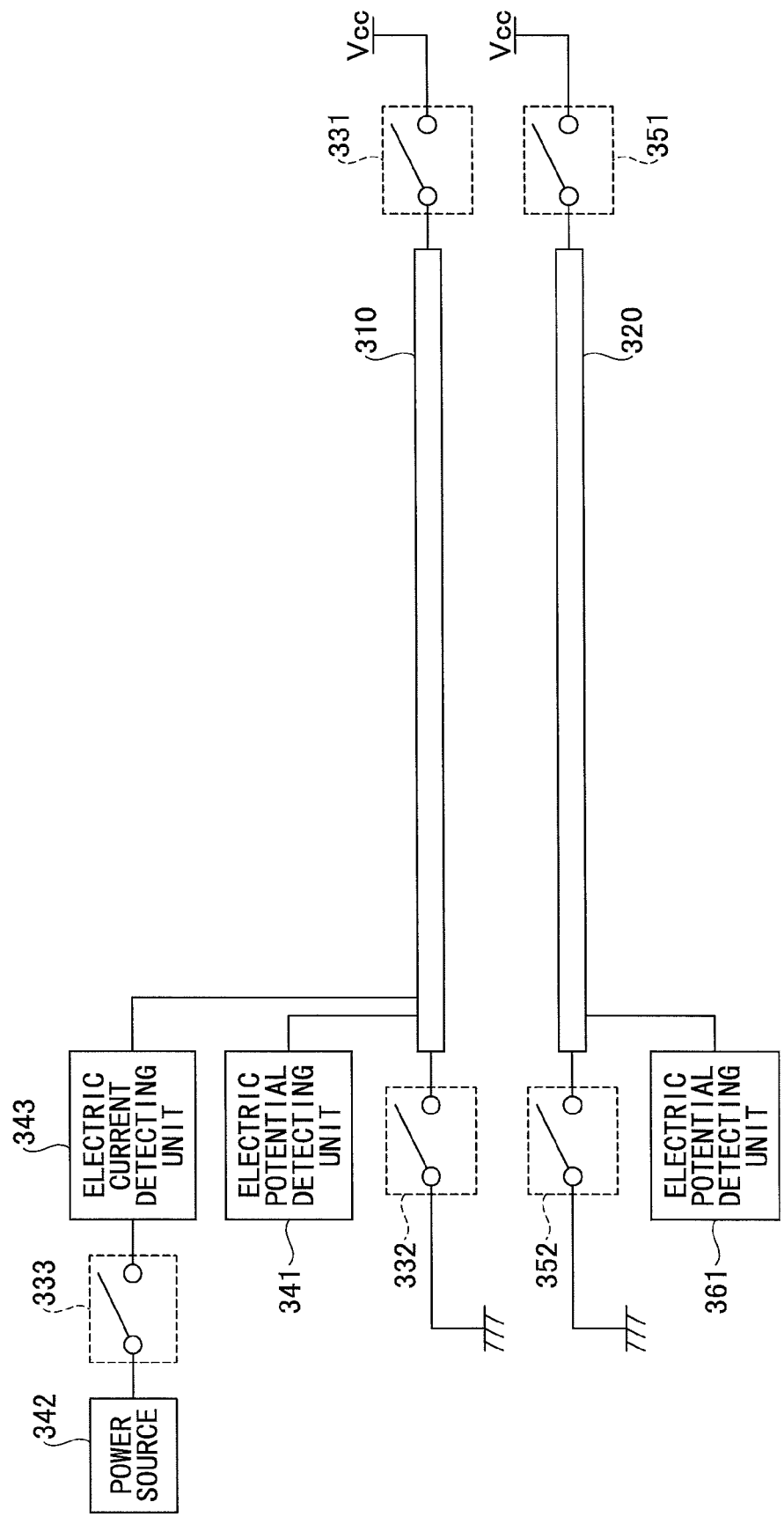
FIG. 6 illustrates the structure of a touch panel of a third embodiment.

A touch panel of the third embodiment is described. Referring to FIG. 6, the touch panel of the third embodiment is a four-wire touch panel having four wires. The touch panel of the third embodiment includes an upper transparent conductive film 310 formed on a surface of an upper electrode substrate made of a transparent film or the like, and a lower transparent conductive film 320 formed on a surface of a lower electrode substrate made of glass or the like. The transparent conductive film 310 is arranged so as to face the lower transparent conductive film 320. Referring to FIG. 6, for convenience of explanation, the upper transparent conductive film 310 and the lower transparent conductive film 320 are illustrated.

Referring to FIG. 6, switches 331 and 332 for generating electric potential gradient in the x-axis direction, an electric potential detecting unit 341 for detecting an electric potential when the upper transparent conductive film 310 contacts the lower transparent conductive film 320, and a power source 342 for applying a predetermined electric potential to the upper transparent conductive film 310 through a switch 333 and an electric current detecting unit 343 are connected to the upper transparent conductive film 310. The switch 331 is connected with a power source electric potential (Vcc). The switch 332 is connected to a ground electric potential. The electric potential detecting unit 341 is an example of a first resistive film type detecting unit. The electric current detecting unit 343 is an example of a capacitance type detecting unit.

Further, switches 351 and 352 for generating electric potential gradient in the y-axis direction and an electric potential detecting unit 361 for detecting an electric potential when the upper transparent conductive film 310 contacts the lower transparent conductive film 320 are connected to the lower transparent conductive film 320. The switch 351 is connected with the power source electric potential (Vcc). The switch 352 is connected to the ground electric potential. The electric potential detecting unit 361 is an example of a second resistive film type detecting unit.

Figure 7:
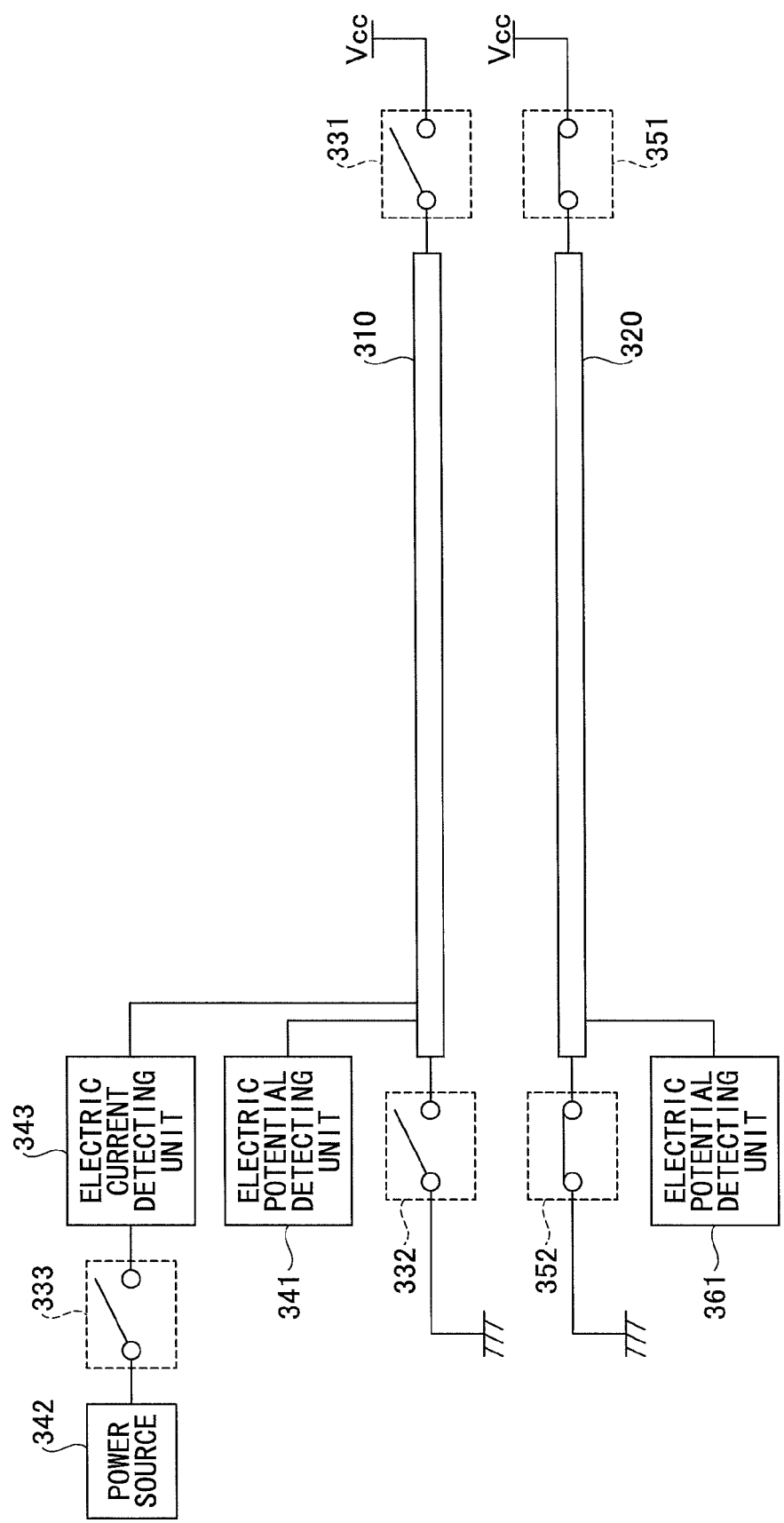
FIG. 7 explains a structure of the touch panel of the third embodiment.

In the touch panel of the third embodiment, when detecting a touch position by using a resistive film type detection, the switches 351 and 352 are close to generate an electric potential gradient in a Y-axis direction of the lower transparent conductive film 320 as illustrated in FIG. 7. At this time, the switches 331 and 332 connected to the upper transparent conductive film 310 are open. In a case where a finger or the like touches under this state, the lower transparent conductive film 320 contacts the upper transparent conductive film 310 at the touch position of the finger on the touch panel. Then, the upper transparent conductive film 310 has an electric potential the same as that of the touch position of the lower transparent conductive film 320. Then, the electric potential is detected by the electric potential detecting unit 341 connected to the upper transparent conductive film 310. Based on this detected electric potential, the Y-coordinate of the touch position on the touch panel can be calculated by a control unit or the like (not illustrated).

Figure 8:
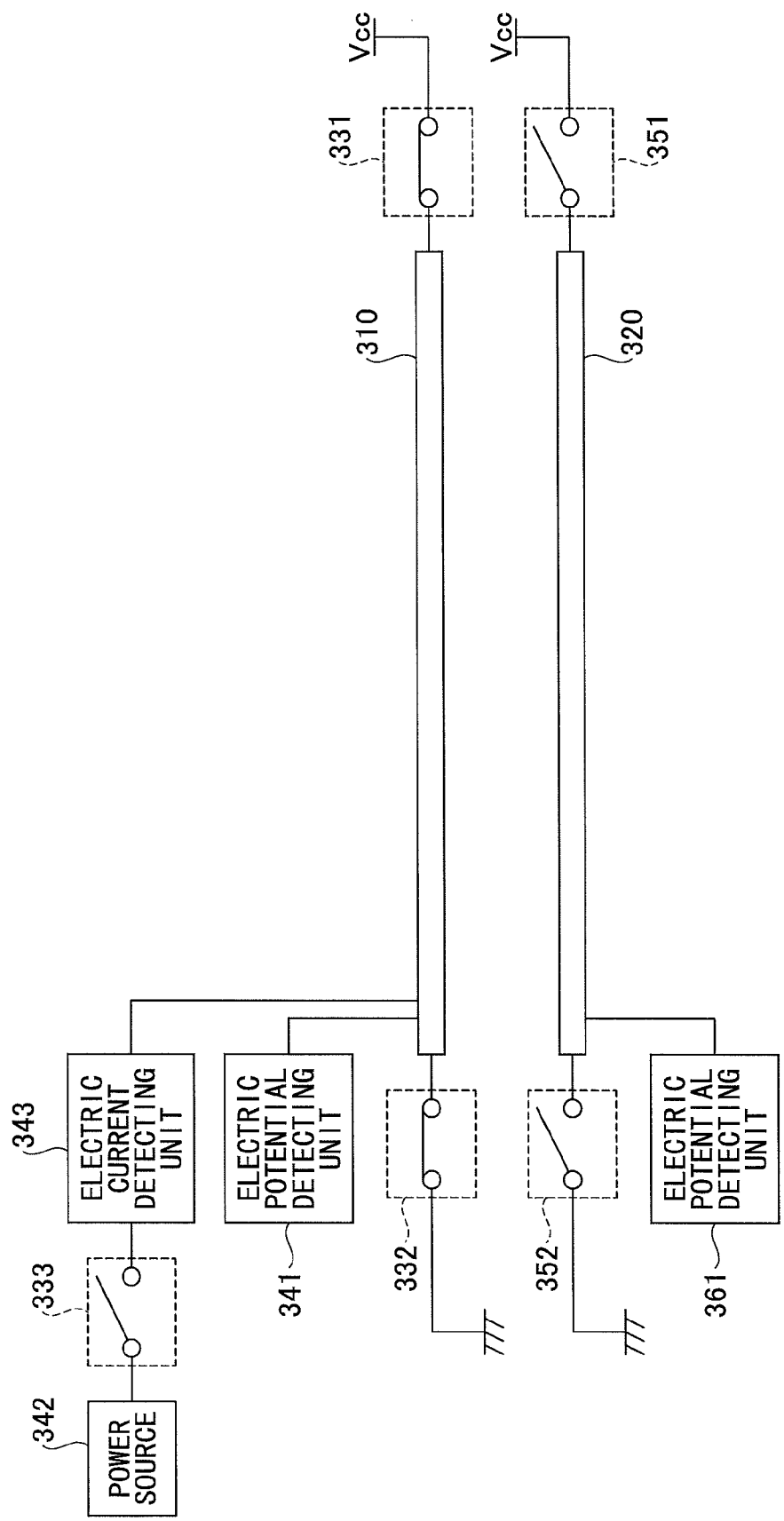
FIG. 8 explains another structure of the touch panel of the third embodiment.

Next, referring to FIG. 8, the switches 331 and 332 are close to generate an electric potential gradient in a X-axis direction of the upper transparent conductive film 310. At this time, the switches 351 and 352 connected to the lower transparent conductive film 320 are open. In a case where a finger or the like touches under this state, the lower transparent conductive film 320 contacts the upper transparent conductive film 310 at the touch position of the finger on the touch panel. Then, the lower transparent conductive film 320 has an electric potential the same as that of the touch position of the upper transparent conductive film 310. Then, the electric potential is detected by the electric potential detecting unit 361 connected to the lower transparent conductive film 320. Based on this detected electric potential, the X-coordinate of the touch position on the touch panel can be calculated by the control unit or the like (not illustrated).

As described, the touch position on the touch panel can be detected by the resistive film type detection.

Figure 9:
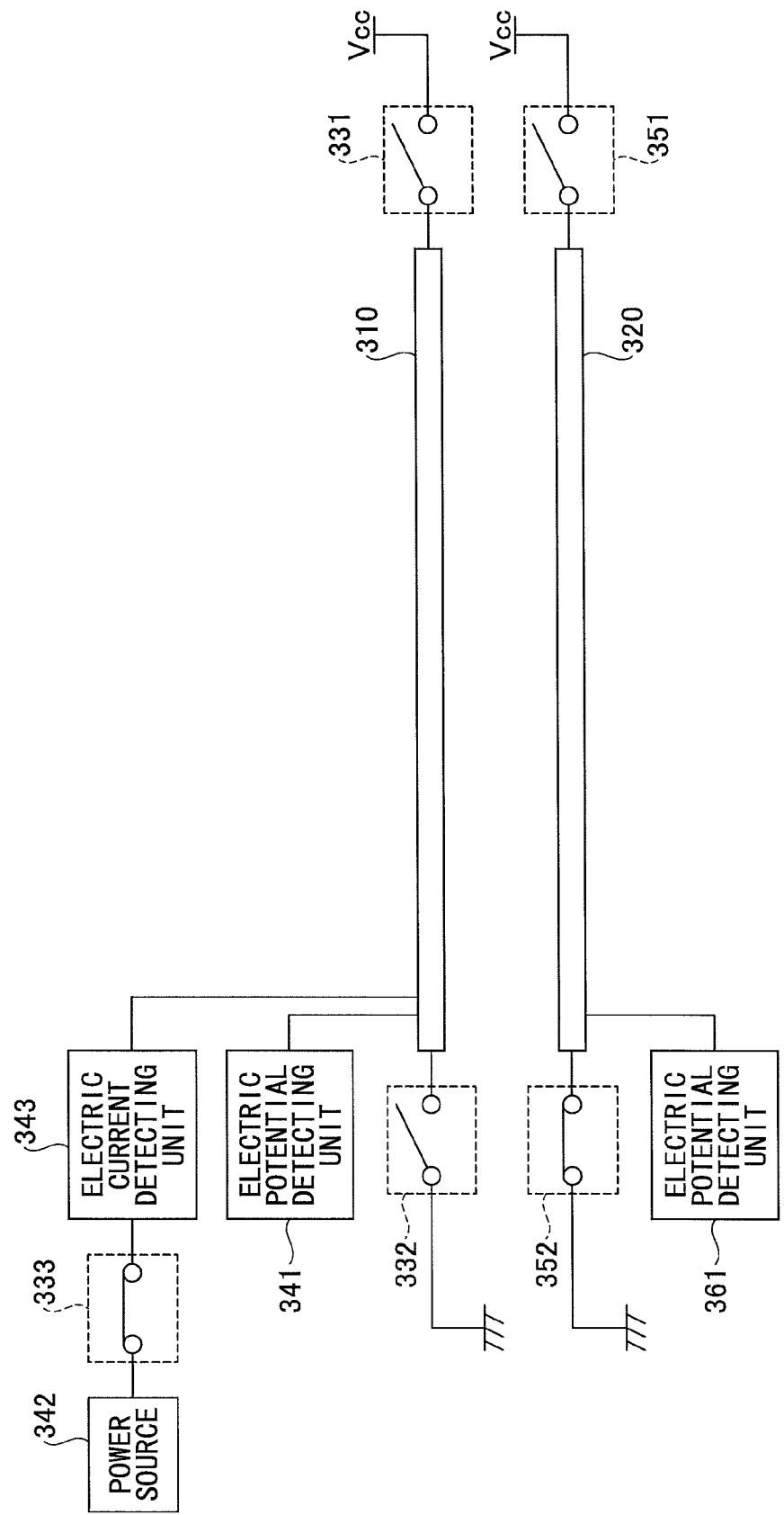
FIG. 9 explains another structure of the touch panel of the third embodiment.

Further, in a case where a capacitance type detection of the touch position is conducted in the touch panel of the third embodiment, the switches 331 and 332 connected to the upper transparent conductive film 310 are open and the switch 333 is close as illustrated in FIG. 9. Then, the electric potential of the upper transparent conductive film 310 has the electric potential supplied from the power source 342. In a case where the finger touches the touch panel under this state, the electrostatic capacitance changes with the touch. Therefore, the amount of current flowing from the power source 342 to the upper transparent conductive film 310 changes. The changed amount of electric current is detected by the electric current detecting unit 343.

The touch panel may have a plurality of the electric current detecting units 343. For example, the electric current detecting units 343 may be provided at four corners of the touch panel. The touch position of the finger on the touch panel can be detected by the control unit (not illustrated) based on the value of the amount of the electric current detected by each of the electric current detecting units 343.

The switch 351 is preferably open and the switch 352 is preferably close in the condition as illustrated in FIG. 9. When the switch 352 is close, the entire surface of the lower transparent conductive film 320 becomes the ground electric potential. Therefore, an influence caused by noise coming from the back surface of the touch sensor can be prevented.

Figure 10A:
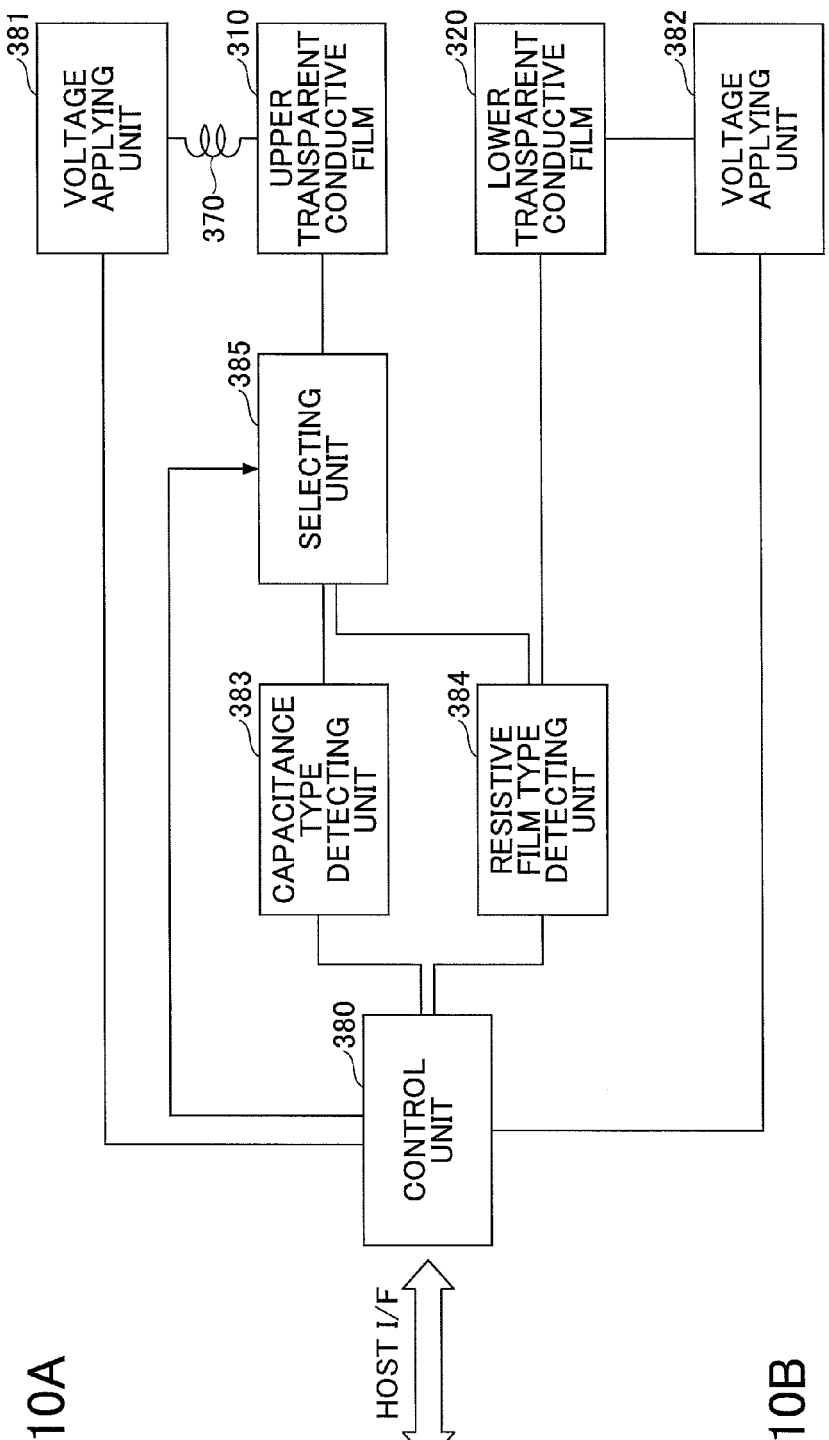
FIG. 10A is a block diagram of a control circuit of the touch panel of the third embodiment.

FIG. 10A is a block diagram of a control circuit for controlling the touch panel of the third embodiment. Referring to FIG. 10A, the control circuit includes a control unit 380, voltage applying units 381 and 382, a capacitance type detecting unit 383, a resistive film type detecting unit 384, and a selecting unit 385. The upper transparent conductive film 310 is connected to the selecting unit 385. The selecting unit 385 is connected to the capacitance type detecting unit 383 and the resistive film type detecting unit 384. The control unit 380 controls to connect one of the capacitance type detecting unit 383 and the resistive film type detecting unit 384 with the upper transparent conductive film 310. Further, the lower transparent conductive film 320 is connected to the resistive film type detecting unit 384.

An inductor 370 is connected between the upper transparent conductive film 310 and the voltage applying unit 381. The inductor 370 is similar to the inductor 170 of the first embodiment and has an inductance satisfying Formula 1. Within the third embodiment, the capacitance in Formula 1 exist between the upper transparent conductive film 310 and the lower transparent conductive film 320, and the resistance exists between the upper transparent conductive film 310 and the lower transparent conductive film 320.

The capacitance type detecting unit 383 is provided to detect the position using the upper transparent conductive film 310 by the capacitance type detection. The capacitance type detecting unit 383 includes, for example, the power source 342, the switch 333, and the electric current detecting unit 343.

The resistive film type detecting unit 384 is provided to detect the position using the upper transparent conductive film 310 and the lower transparent conductive film 320 by the resistive film type detection. The resistive film type detecting unit 384 includes, for example, the electric potential detecting units 341 and 361. The voltage applying unit 381 generates an electric potential distribution in the upper transparent conductive film 310 when the position is detected by the resistive film type detection.

The voltage applying unit 381 includes the power source and the switches 331 and 332. The voltage applying unit 382 generates an electric potential distribution in the upper transparent conductive film 320 when the position is to be detected by the resistive film type detection. The voltage applying unit 381 includes the power source and the switches 351 and 352.

The control unit 380 performs a control of the touch panel, namely a control of a voltage application to the upper transparent conductive film 310 by the voltage applying unit 381 and a control of a voltage application to the lower transparent conductive film 320 by the voltage applying unit 382, and a process of detecting the touch positions on the touch panel based on information from the capacitance type detecting unit 383 and the resistive film type detecting unit 384. The control unit 380 is connected to a host computer or the like (not illustrated) through the host I/F.

In the touch panel of the third embodiment, by inserting the inductor 370 between the upper transparent conductive film 310 and the voltage applying unit 381, it is possible to sharpen the rise of the voltage detected by the capacitance type detecting unit 383. Therefore, the touch panel having a good response in detecting the operation input by the user is obtainable. Thus, the touch panel having good detection sensitivity for an operation input can be provided.

Figure 10B:
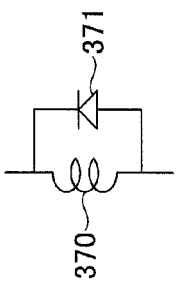
FIG. 10B illustrates a part of the touch panel of the third embodiment.

Referring to FIG. 10B, a diode 371 for restricting a back electromotive force may be connected in parallel with the inductor 370. By using the diode 371, it is possible to quickly converge (stop) the back electromotive force generated during decay. Therefore, the circuit is prevented from being broken.

[d] Fourth Embodiment

Figure 11:
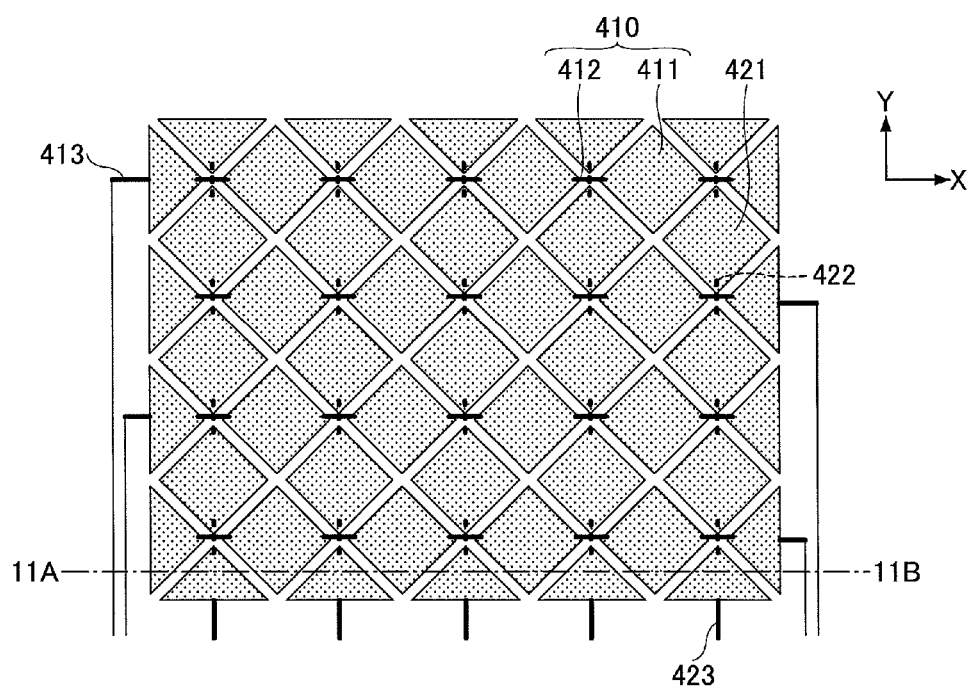
FIG. 11 illustrates a plan view of the touch panel of a fourth embodiment.
Figure 12:
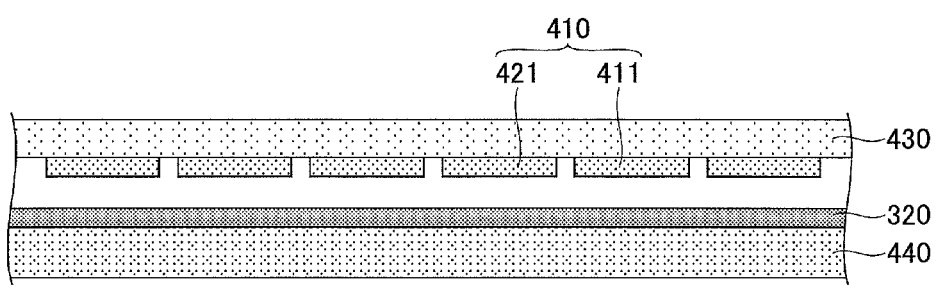
FIG. 12 is a cross-sectional view of a touch panel of the fourth embodiment.

A fourth embodiment is described next. FIG. 11 is a plan view of a touch panel including the upper transparent conductive film 410 of the fourth embodiment. FIG. 12 is a cross-sectional view taken along a dot chain line 11A-11B in FIG. 11. The touch panel of the fourth embodiment has the transparent conductive film divided like a mesh. Referring to FIGS. 11 and 12, an upper transparent conductive film 410 is formed on one surface of a transparent substrate 430. The upper transparent conductive film 410 functions as the upper electrode substrate. The upper transparent conductive film 410 is divided substantially in parallel with a line angled by 45° from the X-axis and the Y-axis. The divided areas of the upper transparent conductive film 410 aligned on an X-axis are electrically connected along the X-axis direction by connecting portion 412, and is connected with a lead wire 413. Further, the areas 421 aligned in a Y-axis are mutually and electrically connected by connecting portions 422 in the Y-axis direction, and is connected with a lead wire 423.

Referring to FIG. 12, the lower transparent conductive film 320 is formed on a transparent substrate 440, which is made of a glass and functions as a lower electrode substrate.

Figure 13:
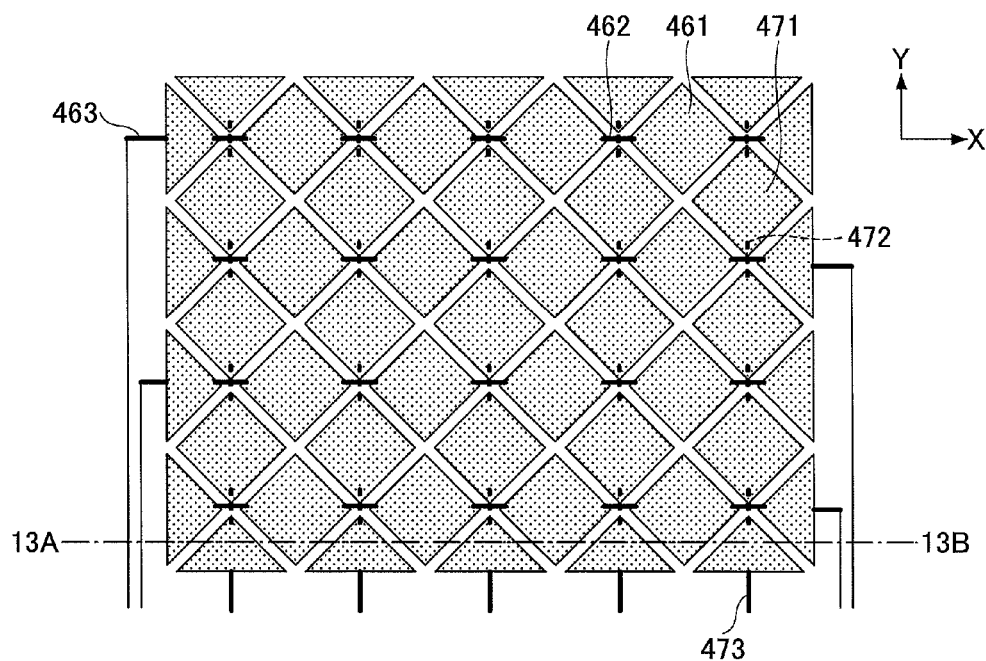
FIG. 13 illustrates a plan view of another touch panel of the fourth embodiment.
Figure 14:
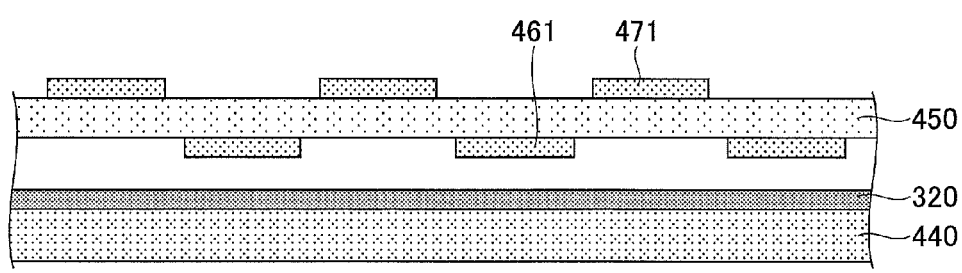
FIG. 14 illustrates a plan view of another touch panel of the fourth embodiment.

FIG. 13 is a plan view of a touch panel including the upper transparent conductive film, which is a modification of the fourth embodiment. FIG. 14 is a cross-sectional view taken along a dot chain line 13A-13B in FIG. 13. Referring to FIGS. 13 and 14, the divided areas of the upper transparent conductive film are formed on each of the both surfaces of a transparent substrate 450 which functions as the upper electrode substrate. Specifically, on one surface of the surfaces of the transparent substrate 450 facing the lower transparent conductive film 320, an area 461 obtained by dividing the upper transparent conductive film and arranged in the Y-axis direction is formed. The areas 461 arranged in the X-axis direction are electrically connected by connecting portions 462 one another, and the outermost area 461 is connected with a lead wire 463. On the other surface of the transparent substrate 450, an area 471 obtained by dividing the upper transparent conductive film and arranged in the X-axis direction is formed. The areas 471 arranged in the Y-axis direction are electrically connected by connecting portions 472 one another, and the outermost area 471 is connected with a lead wire 473.

[e] Fifth Embodiment

Figure 15:
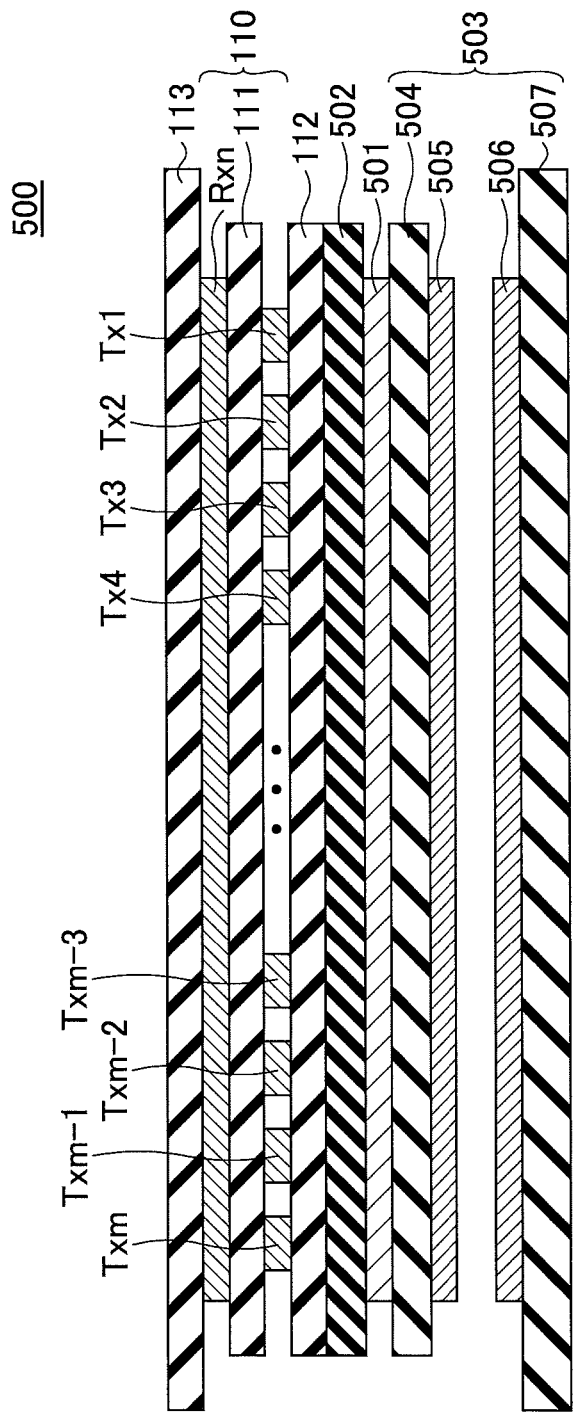
FIG. 15 is a cross-sectional view of a touch panel of a fifth embodiment.

FIG. 15 is a cross-sectional view of a touch panel 500 of a fifth embodiment. In the touch panel 500 of the fifth embodiment, a film 502 with a ground layer 501 formed on its front surface is provided on the back surface of the electrostatic panel 110. A resistive film type panel 503 is provided on the back surface of the electrostatic panel 110 through the film 502. The ground layer 501 is, for example, an ITO film. The film 502 is made of, for example, transparent polycarbonate or polyethylene terephthalate (PET). The ground layer 501 is grounded and restricts an influence of the electric potential or the like of the panel 503 from occurring on the capacitance type panel 110.

The resistive film type panel 503 includes a film 504, an upper transparent conductive film 505, a lower transparent conductive film 506, and a film 507. The upper transparent conductive film 505 is formed on a front surface of the film 504 (the lower surface in FIG. 15). The lower transparent conductive film 506 is formed on a front surface of the film 507 (the upper surface in FIG. 15). The upper transparent conductive film 505 faces the lower transparent conductive film 506 with interposing a predetermined gap.

The capacitance type electrostatic panel 110 or the resistive film type detection panel 503 may be selectively used, or both the capacitance type electrostatic panel 110 and the resistive film type detection panel 503 may be used to detect respective coordinates.

Within the fifth embodiment, it is possible to restrict the influence of the electric potential or the like of the resistive film type panel 503 from occurring in the capacitance type panel 110 since the ground layer is provided between the resistive film type panel 503 and the capacitance type panel 110.

In the fifth embodiment, it is preferable to locate the ground layer 501 on the lower surface side of the film 502 so as to direct toward the resistive film type panel 503 in comparison with the case where the ground layer 501 is located on the upper surface side of the film 502.

[f] Sixth Embodiment

Figure 16:
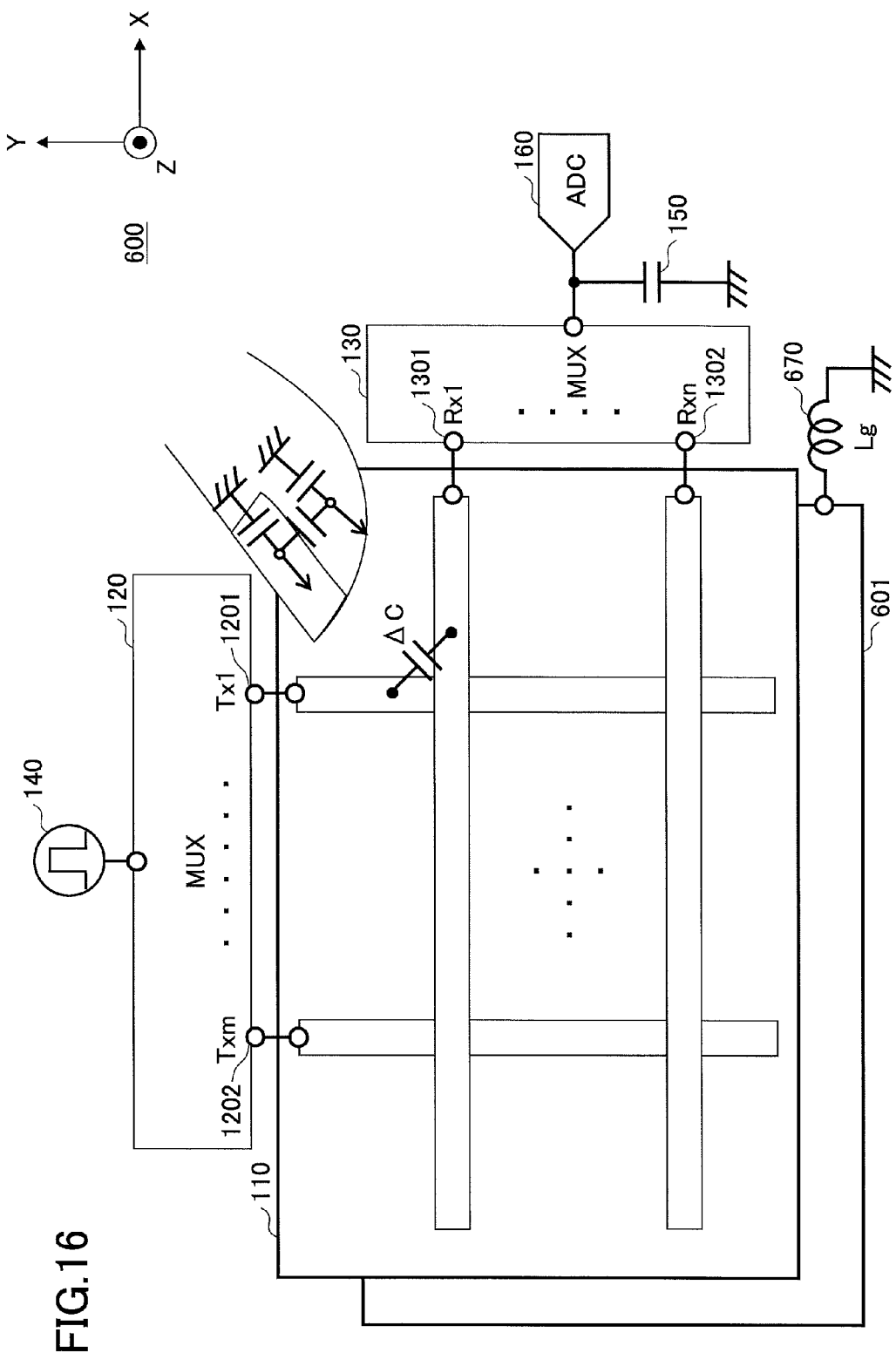
FIG. 16 is a plan view of a touch panel of a sixth embodiment.

FIG. 16 is a plan view of a touch panel 600 of a sixth embodiment. In order to facilitate understanding of the structure of the touch panel 600, only a part of the elements of the touch panel 600 is illustrated in FIG. 16. For convenience of the explanation, axes X, Y, and Z are defined in FIG. 16.

Referring to FIG. 16, the touch panel 600 includes the electrostatic panel 110, the multiplexer (MUX) 120, the multiplexer (MUX) 130, the driving source 140, the capacitor 150, the Analog to Digital Converter (ADC) 160, a ground layer 601, and an inductor 670.

The electrostatic panel 110, the multiplexer 120, the multiplexer 130, the driving source 140, the capacitor 150, and the ADC 160 are similar to those of the first embodiment, the explanation is omitted.

The ground layer 601 is provided on the back surface side of the electrostatic panel 110 (the side opposite to the surface of the electrostatic panel 110 on which an operation input is conducted). The ground layer 601 is maintained to have the ground electric potential or a predetermined electric potential. The ground layer 601 is, for example, a metallic film such as a copper foil or a transparent conductive film such as ITO. For example, in a case where the resistive film type panel is located on the back surface side of the electrostatic panel 110, it is preferable to use a transparent conductive film as the ground layer 601.

The electrostatic panel 110 may be influenced by noise or the like generated by circumjacent electronic parts. Therefore, in a case where the electrostatic panel 110 is used under an environment greatly influenced by the noise, it is effective to use the ground layer 601 so that the noise is cut off.

The inductor 670 is connected between the ground layer 601 and the reference electric potential point (the ground point in FIG. 16).

In the above mentioned touch panel 600, while the multiplexer 130 selects one of the electrodes Rx1 to Rxn, the multiplexer 120 selects the electrodes Tx1 to Txm in order and applies the rectangular wave voltage to the selected electrode. This process is repeated for each of the selected electrodes Rx1 to Rxn.

In a case where the user does not touch the electrostatic panel 110, electrostatic capacitances between the electrodes Tx1 to Txm and the electrodes Rx1 to Rxn have default values. Therefore, the value of the digital signal output from the ADC 160 is constant.

Referring to FIG. 16, when the finger of the user touches the electrostatic panel 110 through the decoration film 113, the electrostatic capacitance at the portion of the electrostatic panel 110 where the finger touches changes. FIG. 16 schematically illustrates an example that the electrostatic capacitance changes by ΔC with the touch of user's finger. As described, if the electrostatic capacitance changes, it is possible to determine the position where the operation input is done with reference to the combinations of the electrodes Tx1 1201 to Txm 1202 and the electrodes Rx1 1301 to Rxn 1302. With this, the touch panel 600 can detect the coordinate where the operation input is done.

Meanwhile, the electrostatic capacitances in the electrostatic panel 110 are not ignorable. Therefore, when the rectangular wave voltages are input in the electrodes Tx1 1201 to Txm 1202 from the multiplexer 120, rise and decay of the voltage detected by the multiplexer 130 through the electrodes Rx1 1301 to Rxn 1302 become gentle.

Further, since the ground layer 601 is provided, in comparison with the case where the electrostatic panel 110 is used without providing the ground layer 601, an apparent electrostatic capacitance of the electrostatic panel 110 increases. Therefore, the rise and decay of the voltage detected by the multiplexer 130 becomes further gentle in comparison with the case where the electrostatic panel 110 is used without providing the ground layer 601.

Further when the amount of electric charge stored in the electrostatic panel 110 is constant, the value of the voltage decreases if the electrostatic capacitance of the electrostatic panel 110 increases. Therefore, if the ground layer 601 is used, in comparison with the case where the ground layer 601 is not used, the value of the voltage detected by the ADC 160 decreases.

Figure 17A:
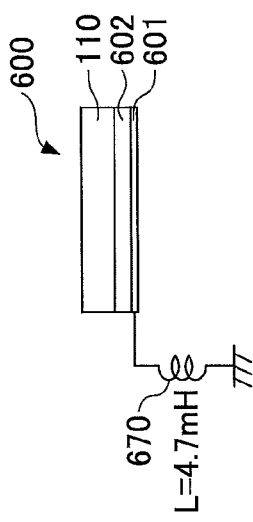
FIG. 17A, FIG. 17B, and FIG. 17C illustrate examples of waveforms of a voltage detected by a multiplexer of the touch panel of the sixth embodiment.
Figure 17A:
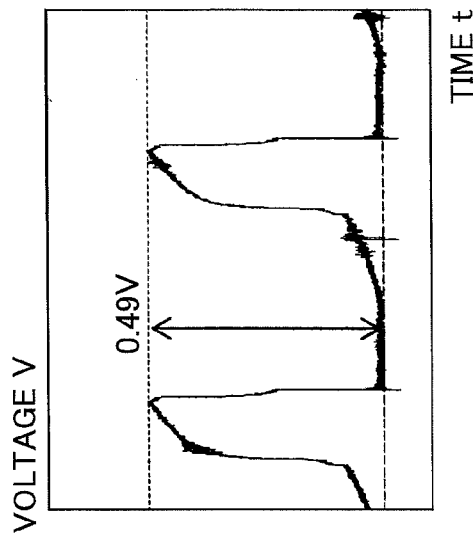
Figure 17B:
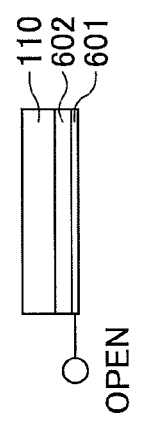
Figure 17B:
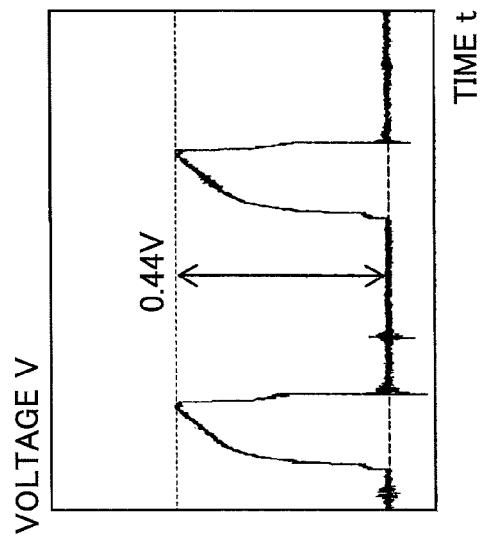
Figure 17C:
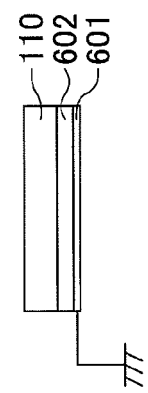
Figure 17C:
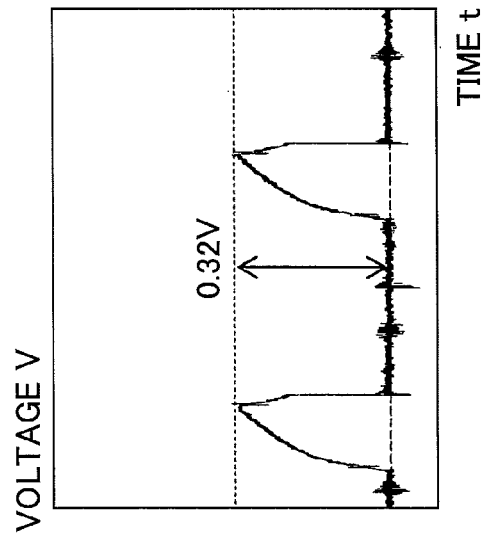

Referring to FIGS. 17A to 17C, an effect of using the inductor 670 is explained.

FIGS. 17A to 17C illustrate cross-sectional views of the touch sensors formed by inserting films 602 between the electrostatic panels 110 and the ground layers 601. The film 602 is made of, for example, polycarbonate or polyethylene terephthalate (PET). The ground layer 601 may be, for example, an indium tin oxide (ITO) film formed on one surface of the film 602. FIG. 17A illustrates the touch sensor where the inductor 670 is not connected and the ground layer 601 is directly grounded. FIG. 17B illustrates the touch sensor where the inductor 670 is not connected and the ground layer 601 is floated. FIG. 17C illustrates the touch panel 600 of the sixth embodiment.

FIG. 17A, FIG. 17B, and FIG. 17C further illustrate examples of waveforms of a voltage detected by the multiplexer 130 of the touch panel 600 of the sixth embodiment. FIG. 17A is a comparative waveform in a case where the inductor 670 is not connected and the ground layer 601 is directly grounded. FIG. 17B is another comparative waveform in a case where the inductor 670 is not connected and the ground layer 601 is floated. FIG. 17C is an exemplary waveform of the voltage detected by the multiplexer 130 of the touch panel 600 of the sixth embodiment.

Referring to FIG. 17A, the peak value of the voltage is 0.32 V, and the waveform during rise is relatively gentle. Referring to FIG. 17B, the peak value of the voltage increases to 0.44 V, and the waveform during rise is relatively gentle. The reason why the value of the voltage is high in FIG. 17B in comparison with the value of the voltage in FIG. 17A is that, the electrostatic capacitance of the electrostatic panel 110 in FIG. 17B becomes smaller than in FIG. 17A by making the ground layer 601 have the floating electric potential.

Referring to FIG. 17C, the peak value of the voltage is 0.49 V, and the waveform during rise is relatively sharp in comparison with those in FIGS. 17A and 17B.

Within the sixth embodiment, by inserting the inductor 670 between the ground layer 601 and the ground point, it is possible to sharpen the rise of the voltage detected by the ADC 160 and the value of the detected voltage can be increased. Therefore, the touch panel 600 having a good response in detecting the operation input by the user is obtainable. Thus, the touch panel 600 having good detection sensitivity for an operation input can be provided.

Meanwhile, a resistor may be connected in parallel with the inductor 670.

[g] Seventh Embodiment

Figure 18A:
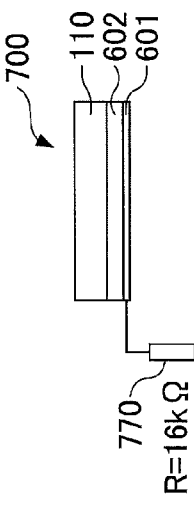
FIG. 18A, FIG. 18B, and FIG. 18C illustrate examples of waveforms of a voltage detected by a multiplexer of a touch panel of a seventh embodiment.
Figure 18A:
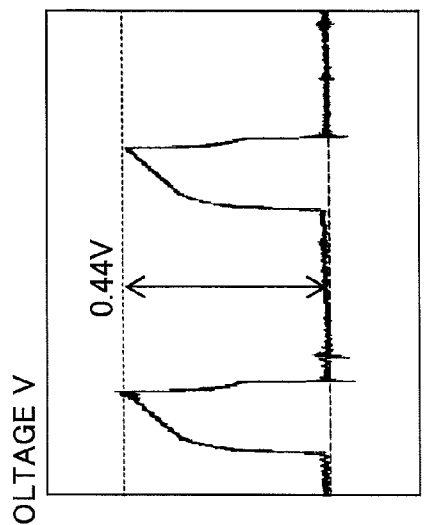
Figure 18B:
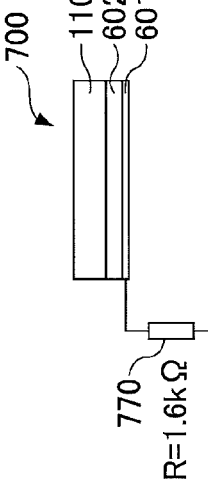
Figure 18B:
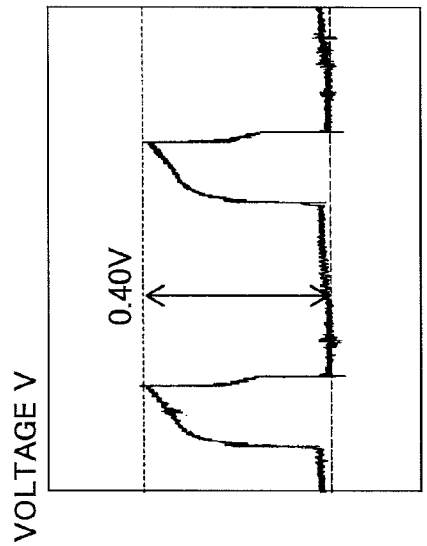
Figure 18C:
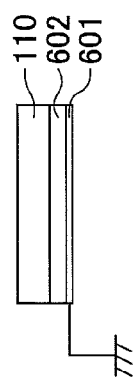
Figure 18C:
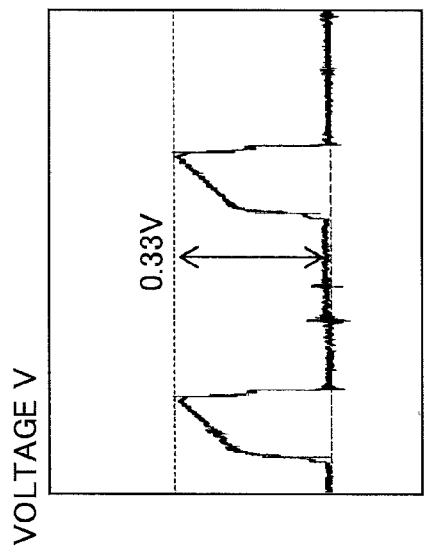

FIG. 18A, FIG. 18B, and FIG. 18C illustrate examples of waveforms of a voltage detected by a multiplexer of a touch panel of a seventh embodiment.

In the touch panel of the seventh embodiment, a resistor 770 is used. The same reference symbols are attached to the elements similar to the touch panel 600 of the sixth embodiment, and description of the similar elements is omitted. Further, FIG. 16 is invoked.

Figure 18D:
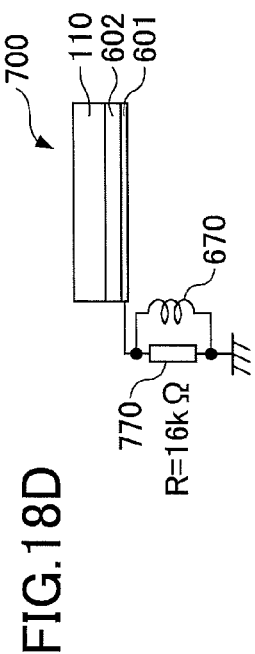
FIG. 18D illustrates a structure of the touch panel of the seventh embodiment.

FIG. 18A illustrates a comparative waveform detected by the multiplexer 130 in a case where the resistor 770 is not connected to a touch panel and the ground layer 601 is directly grounded. FIG. 18B illustrates an exemplary waveform detected by the multiplexer 130 in a case where the resistance value of the resistor 770 set to 1.6 kΩ is connected to the ground layer 601. FIG. 18 illustrates another exemplary waveform detected by the multiplexer 130 in a case where the resistance value of the resistor 770 is set to be 16 kΩ. FIG. 18D illustrates a touch panel, in which the inductor 670 is connected in parallel with the resistor 770.

Referring to FIG. 18A, the peak value of the voltage is 0.33 V, and the waveform during rise is relatively gentle. Referring to FIG. 18B, the peak value of the voltage is 0.40 V, and the waveform during rise is relatively sharp in comparison with that in FIG. 18A. Referring to FIG. 18C, the peak value of the voltage is 0.44 V, and the waveform during rise is relatively sharp in comparison with that in FIG. 18A. The impedance is adjusted by inserting the resistor 770 in a manner similar to a case where the inductor 670 (see FIG. 17C) is inserted. Therefore, it is assumed that the influence of the electrostatic capacitance in the electrostatic panel 110 is relaxed. Then, the value of the voltage increases and the rise is sharpened.

Within the seventh embodiment, by inserting the resistor 770 between the ground layer 601 and the ground point, it is possible to sharpen the rise of the voltage detected by the ADC 160 and the value of the detected voltage can be increased. Therefore, the touch panel having a good response in detecting the operation input by the user is obtainable. Thus, the touch panel having good detection sensitivity for an operation input can be provided.

Further, referring to FIG. 18D, the inductance may be connected in parallel with the resistor 770.

[h] Eighth Embodiment

Figure 19A:
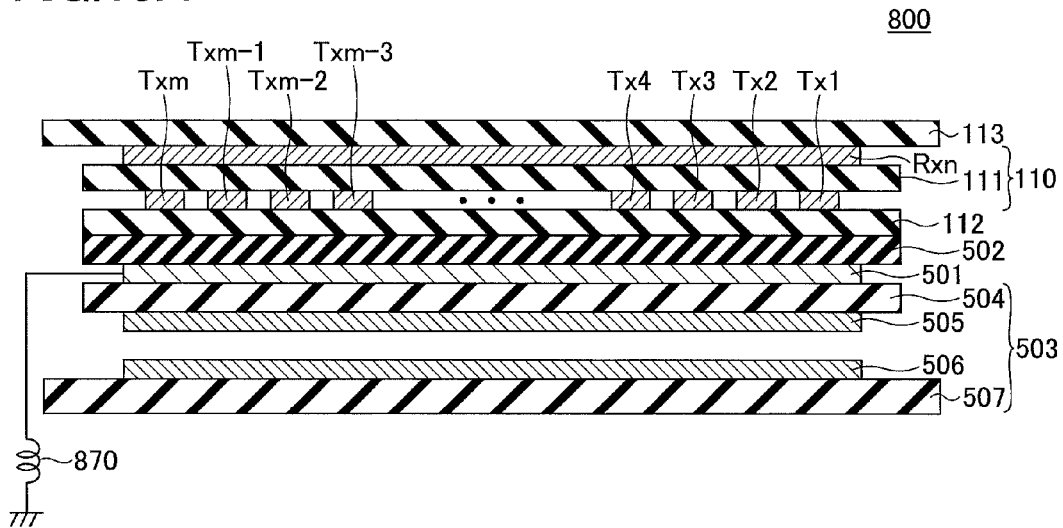
FIG. 19A is a cross-sectional view of a touch panel of an eighth embodiment.
Figure 19B:
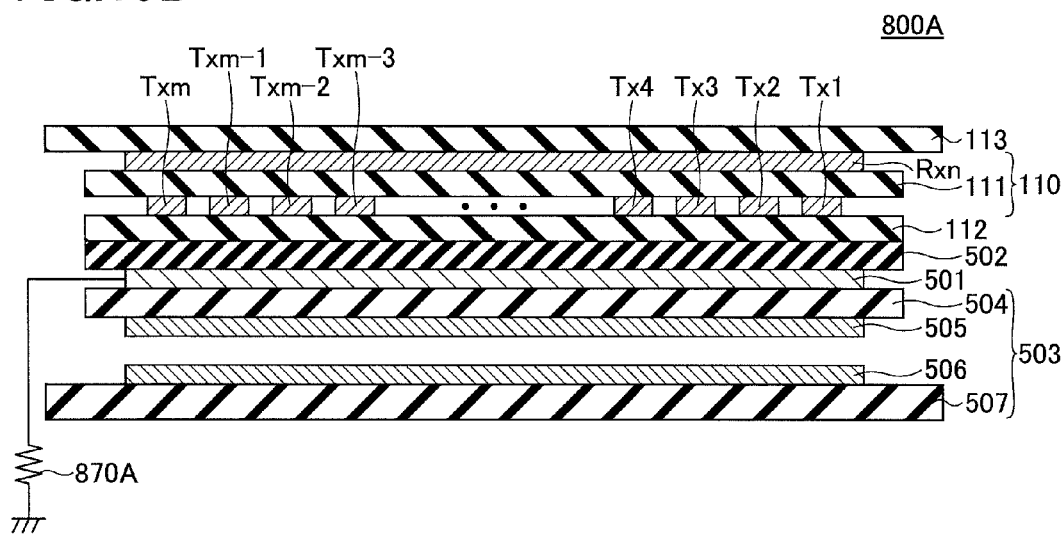
FIG. 19B is a cross-sectional view of a touch panel of the eighth embodiment.

FIGS. 19A and 19B are cross-sectional views of touch panels 800 and 800A of an eighth embodiment. Referring to FIG. 19A, the touch panel 800 of the eighth embodiment is formed by connecting an inductor 870 to the ground layer 501 of the touch panel 500 of the fifth embodiment. The structure other than the connection of the inductor 870 is the same as the touch panel 500 of the fifth embodiment. Therefore, the repeated explanation is omitted.

One end of the inductor 870 is connected to the ground layer 501 and the other end is grounded. In a manner similar to the sixth embodiment, by inserting the inductor 870 between the ground layer 501 and the ground point, it is possible to sharpen the rise of the voltage detected by the ADC 160 and the value of the detected voltage can be increased. Therefore, the touch panel 800 having a good response in detecting the operation input by the user is obtainable. Thus, the touch panel 800 having good detection sensitivity for an operation input can be provided.

Referring to FIG. 19B, instead of providing the inductor 870, a resistor 870A may be connected to the ground layer 501 of the touch panel 500. Also in this case, by inserting the resistor 870A between the ground layer 501 and the ground point, it is possible to sharpen the rise of the voltage detected by the ADC 160 and the value of the detected voltage can be increased. Therefore, the touch panel 800A having a good response in detecting the operation input by the user is obtainable. Thus, the touch panel 800A having good detection sensitivity for an operation input can be provided.

Figure 19C:
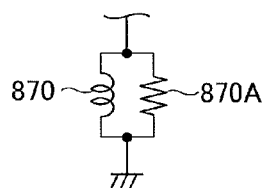
FIG. 19C illustrates a part of the touch panel of the eighth embodiment.

FIG. 19C illustrates a replacement of the resistor 870A in FIG. 19B. Referring to FIG. 19C, the inductor 870 may be connected in parallel with the resistor 870A in FIG. 19B.

[i] Ninth Embodiment

Figure 20:
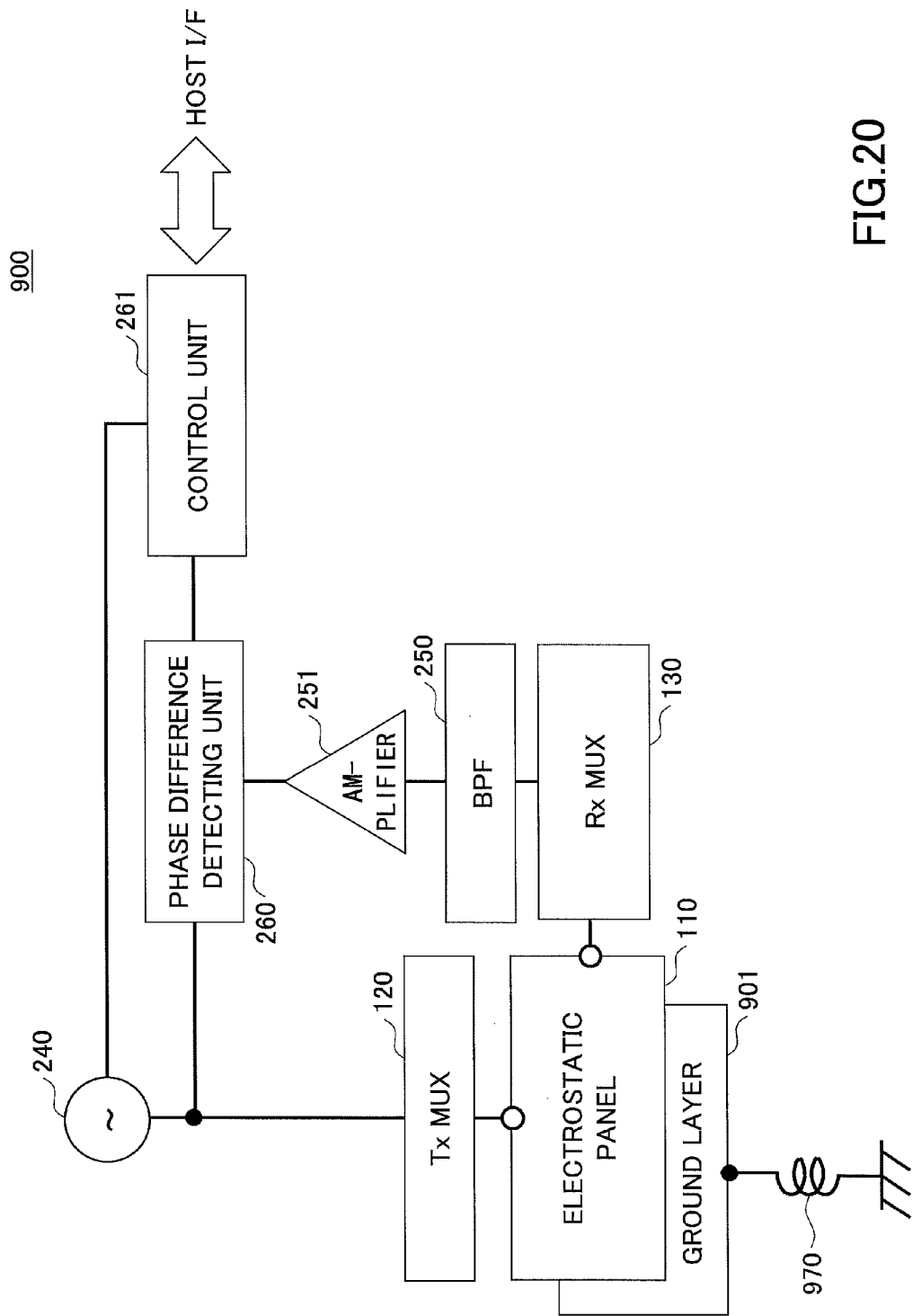
FIG. 20 illustrates the structure of a touch panel of a ninth embodiment.

FIG. 20 illustrates the structure of a touch panel 900 of a ninth embodiment. In the touch panel 900 of the ninth embodiment, the inductor 270 of the touch panel 200 of the second embodiment is removed and a ground layer 901 and an inductor 970 are added.

The ground layer 901 and the inductor 970 are similar to the ground layer 601 and the inductor 670 (see FIG. 16) of the sixth embodiment.

One end of the inductor 970 is connected to the ground layer 901 and the other end is grounded. In a manner similar to the sixth embodiment, by inserting the inductor 970 between the ground layer 901 and the ground point, it is possible to sharpen the rise of the voltage detected by the ADC 160 and the value of the detected voltage can be increased. Therefore, the touch panel 900 having a good response in detecting the operation input by the user is obtainable. Thus, the touch panel 900 having good detection sensitivity for an operation input can be provided.

As described, a touch panel having good detection sensitivity for an operation input is obtainable as a peculiar effect.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the touch panel has been described in detail, it should be understood that the various changes, substitutions, and alterations could be made hereto without departing from the spirit and scope of the invention.

What is claimed is:

1. A touch panel comprising:
a panel having an electrostatic capacitance C, the panel including
a plurality of first conductive films arranged in a first direction, and
a plurality of second conductive films arranged in a second direction different from the first direction;
a first selecting unit connected to the first conductive films to select one first conductive film or more from the first conductive films;
a second selecting unit connected to the second conductive films to select one second conductive film or more from the second conductive films; and
an inductor connecting the first selecting unit with a power source, which applies a voltage to the first conductive films, an inductance L of the inductor being determined in relation to the electrostatic capacitance C of the panel.

2. The touch panel according to claim 1,
wherein the electrostatic capacitance C of the panel, a resistance R of the panel, and the inductance L of the inductor satisfy a relationship of:

$L \geq C \times (R/2)^2$.

3. The touch panel according to claim 1,
wherein the electrostatic capacitance C of the panel, a frequency f of the voltage applied to the selected first conductive film, and the inductance L of the inductor satisfy a relationship of:

$L \geq 1/(C \times (2\pi f)^2)$.

4. The touch panel according to claim 3,
wherein the voltage is a sinusoidal voltage.

5. The touch panel according to claim 1, further comprising:
a diode whose cathode is connected with a terminal of the inductor on a high electric potential side and whose anode is connected with a terminal of the inductor on a low electric potential side.

6. A touch panel comprising:
a panel including
a plurality of first conductive films arranged in a first direction, and
a plurality of second conductive films arranged in a second direction;
a first selecting unit connected to the first conductive films to select one first conductive film or more from the first conductive films;
a second selecting unit connected to the second conductive films to select one second conductive film or more from the second conductive films; and
a ground layer whose one side is arranged to face a surface of the panel, the ground layer being connected with a reference electric potential.

7. The touch panel according to claim 6, further comprising:
an inductor connecting the ground layer with the reference electric potential.

8. The touch panel according to claim 6, further comprising:
a resistor connecting the ground layer with the reference electric potential.

9. The touch panel according to claim 8, further comprising:
an inductor connecting the ground layer with the reference electric potential,
wherein the inductor is connected in parallel with the resistor.

10. The touch panel according to claim 6, further comprising:
a resistive film type panel arranged to face another side of the ground layer opposite to the one side of the ground layer so that the ground layer is interposed between the panel and the resistive film type panel.

11. The touch panel according to claim 2,
wherein the voltage is in a shape of a rectangular wave.

12. The touch panel according to claim 1,
wherein the electrostatic capacitance C of the panel and the inductance L of the inductor are connected in series to perform a series resonance.

13. The touch panel according to claim 6,
wherein the reference electric potential is a ground potential.

* * * * *